United States Patent
Salewski

(10) Patent No.: US 11,654,830 B2
(45) Date of Patent: May 23, 2023

(54) COVERING APPARATUS FOR A LOADING SPACE OF A MOTOR VEHICLE

(71) Applicant: BOS GmbH & Co. KG, Ostfildern (DE)

(72) Inventor: Jürgen Salewski, Wendlingen (DE)

(73) Assignee: BOS GMBH & CO. KG, Ostfildern (DE)

(*) Notice: Subject to any disclaimer, the term of this patent is extended or adjusted under 35 U.S.C. 154(b) by 0 days.

(21) Appl. No.: 17/400,447

(22) Filed: Aug. 12, 2021

(65) Prior Publication Data

US 2022/0048435 A1 Feb. 17, 2022

(30) Foreign Application Priority Data

Aug. 14, 2020 (DE) .......................... 102020210386.0
Jan. 18, 2021 (DE) .......................... 102021200418.0

(51) Int. Cl.
*B60R 5/04* (2006.01)

(52) U.S. Cl.
CPC .................................... *B60R 5/045* (2013.01)

(58) Field of Classification Search
CPC .... B60R 5/045; B60J 7/14; B60J 7/141; B60J 7/198; B60J 7/068; B60J 7/04; B60J 7/047; B60J 7/041; B60J 11/02; B60P 7/02; B62D 33/04
USPC .. 296/24.4, 100.01, 100.06, 100.09, 98, 219
See application file for complete search history.

(56) References Cited

U.S. PATENT DOCUMENTS

| | | | |
|---|---|---|---|
| 4,518,194 A | 5/1985 | Kirkham et al. | |
| 4,550,945 A * | 11/1985 | Englehardt | B60J 7/041 296/100.09 |
| 4,747,441 A * | 5/1988 | Apolzer | B60J 7/041 296/100.09 |
| 4,795,206 A | 1/1989 | Adams | |
| 5,335,961 A * | 8/1994 | Reinsch | B60J 7/047 296/213 |
| 6,095,588 A * | 8/2000 | Rodosta | B60J 7/141 296/100.09 |
| 6,113,176 A * | 9/2000 | Bernardo | B60J 7/041 296/100.09 |
| 6,276,735 B1 | 8/2001 | Champion | |
| 6,321,819 B1 * | 11/2001 | Copp | B60J 7/041 296/100.09 |
| 8,939,494 B2 | 1/2015 | Maimin et al. | |

(Continued)

FOREIGN PATENT DOCUMENTS

DE 10323605 B4 12/2004
WO 2018156921 A1 8/2018

OTHER PUBLICATIONS

German Office Action issued in corresponding German Application No. 10 2020 210 386.0 dated Jan. 25, 2021 (6 pages).

(Continued)

*Primary Examiner* — Joseph D. Pape
*Assistant Examiner* — Veronica M Shull
(74) *Attorney, Agent, or Firm* — Flynn Thiel, P.C.

(57) ABSTRACT

A covering apparatus for a loading space of a motor vehicle, with a covering arrangement having a plurality of dimensionally stable slats coupled to one another in an extended covering state and positioned in a manner stacked one on top of another in a receiving space in a stowed inactive position. The slats are coupled permanently to one another among one another by at least one flexible connecting strap.

20 Claims, 14 Drawing Sheets

(56) References Cited

U.S. PATENT DOCUMENTS

| | | | |
|---|---|---|---|
| 9,266,416 B1* | 2/2016 | Nania | B60J 7/198 |
| 9,399,391 B2 | 7/2016 | Bernardo et al. | |
| 9,597,995 B1* | 3/2017 | Weltikol | B60J 7/141 |
| 2004/0232720 A1* | 11/2004 | Schlecht | B60R 5/047 |
| | | | 296/37.16 |
| 2009/0236870 A1* | 9/2009 | Duncan | B60J 7/141 |
| | | | 296/136.04 |
| 2019/0389287 A1* | 12/2019 | Pompili | B60J 7/196 |

OTHER PUBLICATIONS

German Office Action issued in corresponding German Application No. 10 2021 200 418.0 dated Nov. 11, 2021 (6 pages).

\* cited by examiner

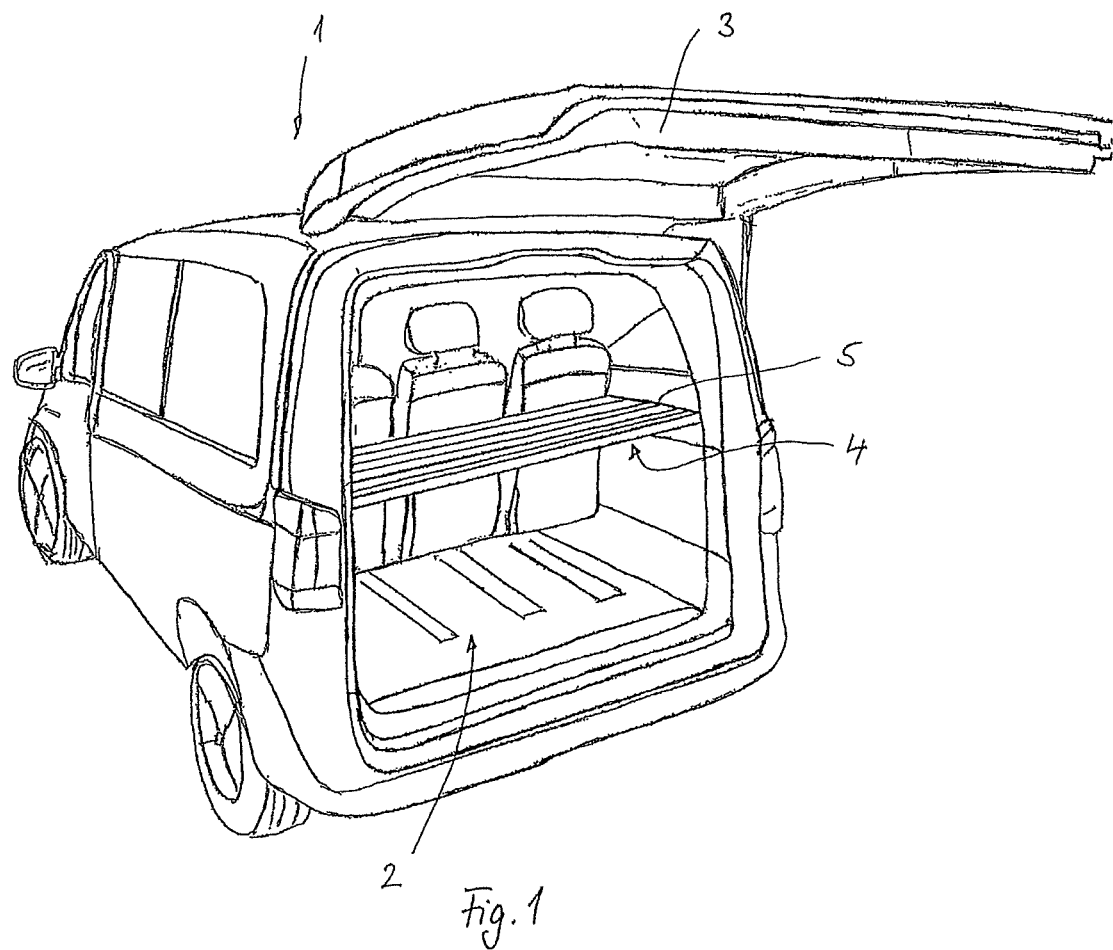

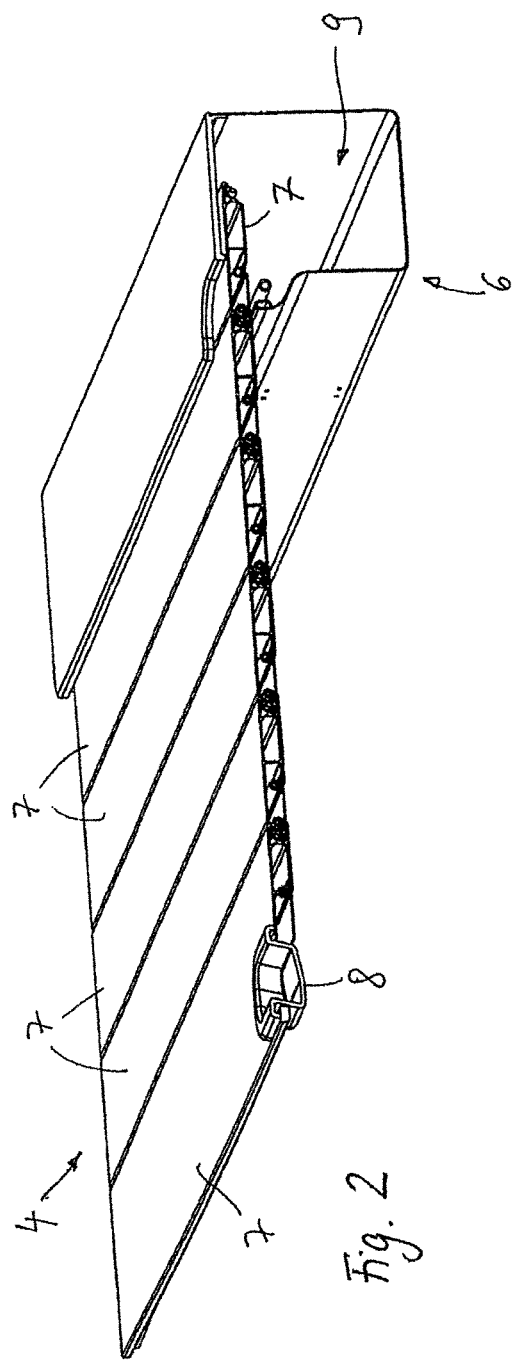
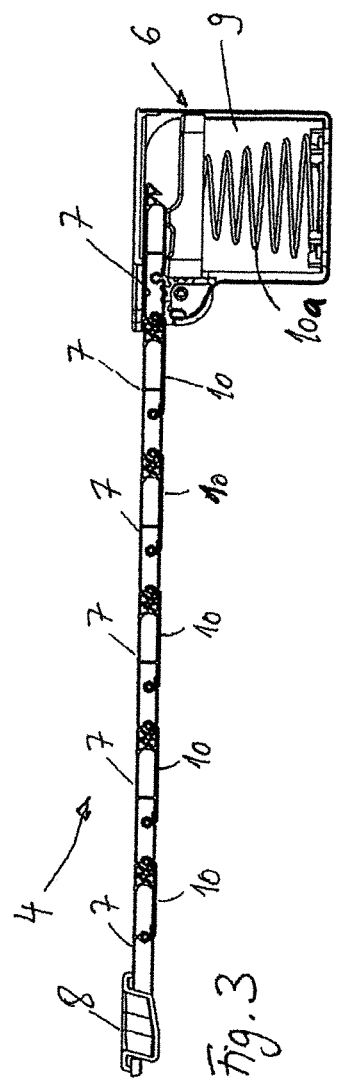

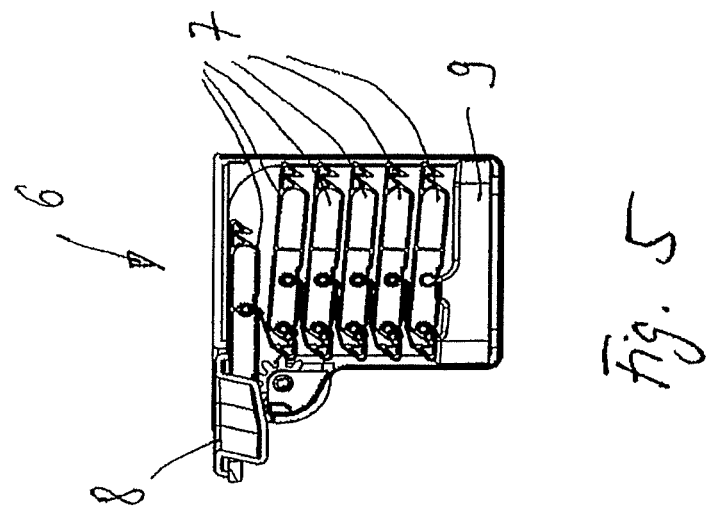
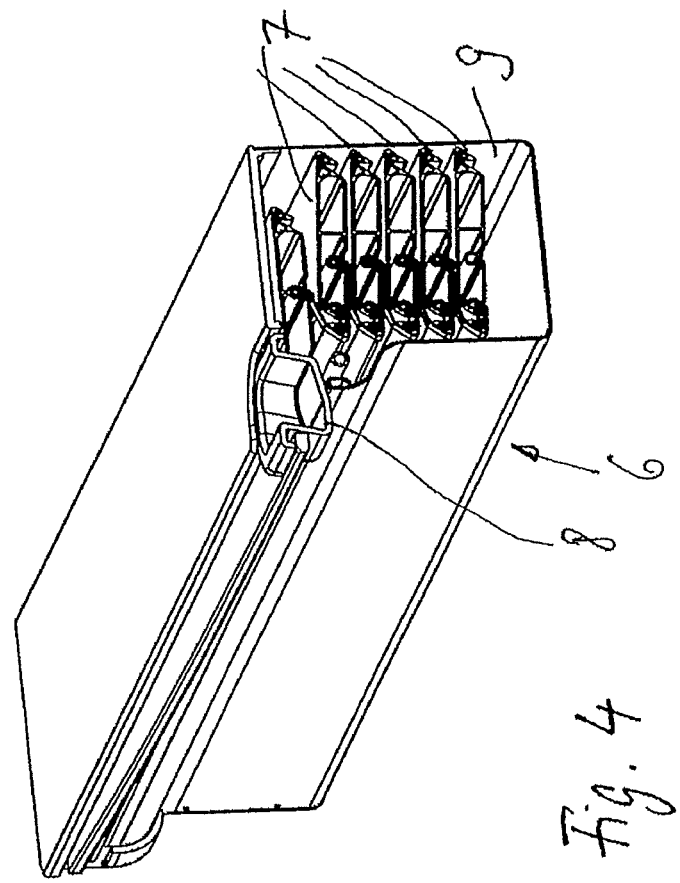

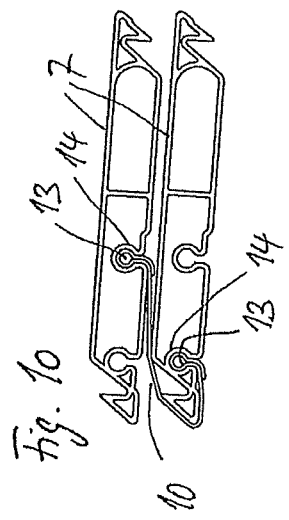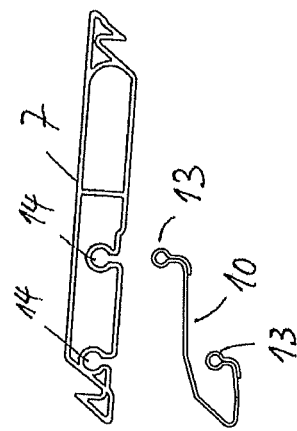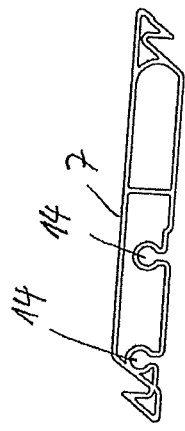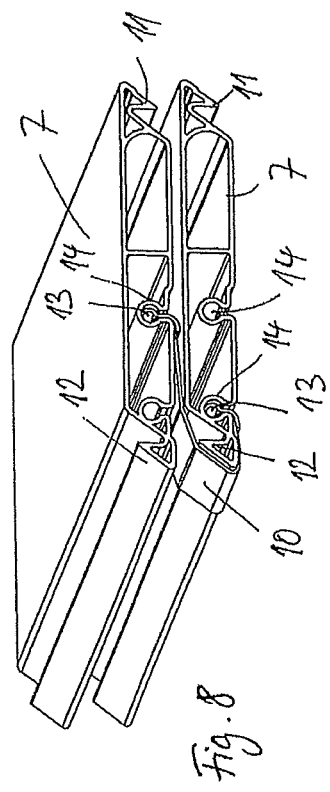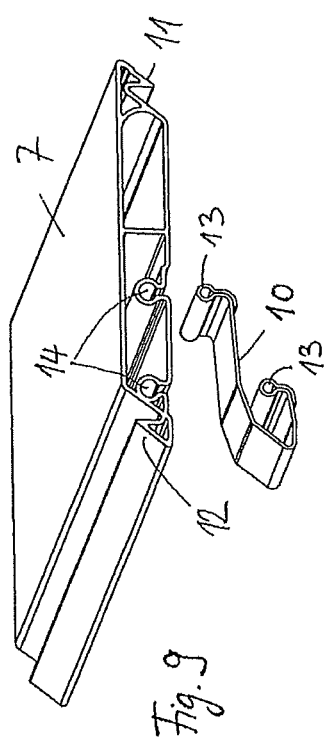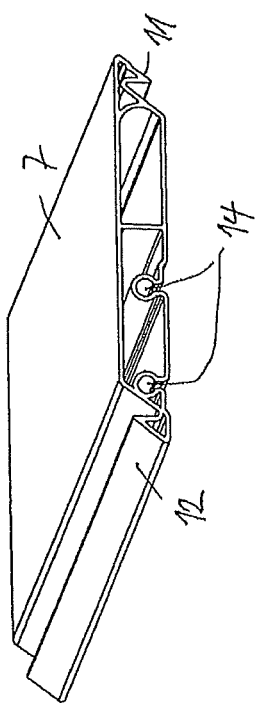

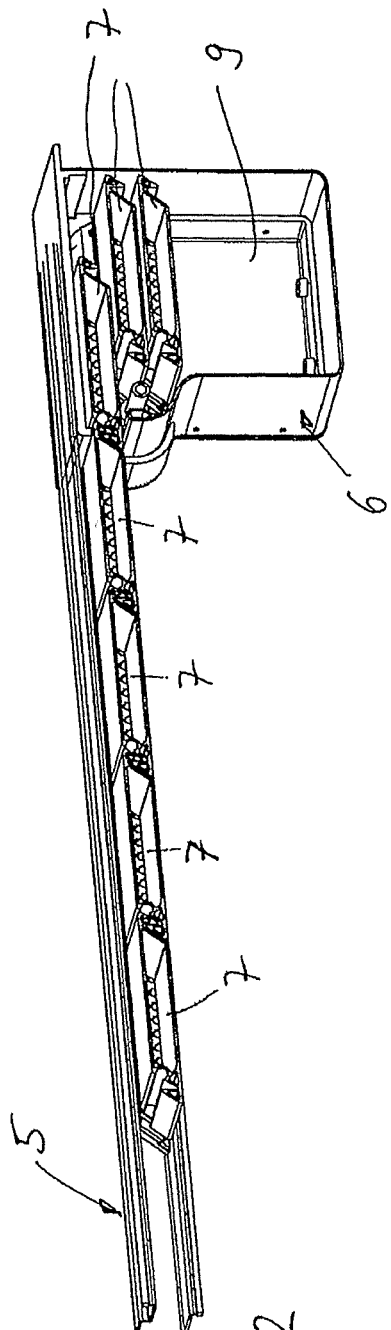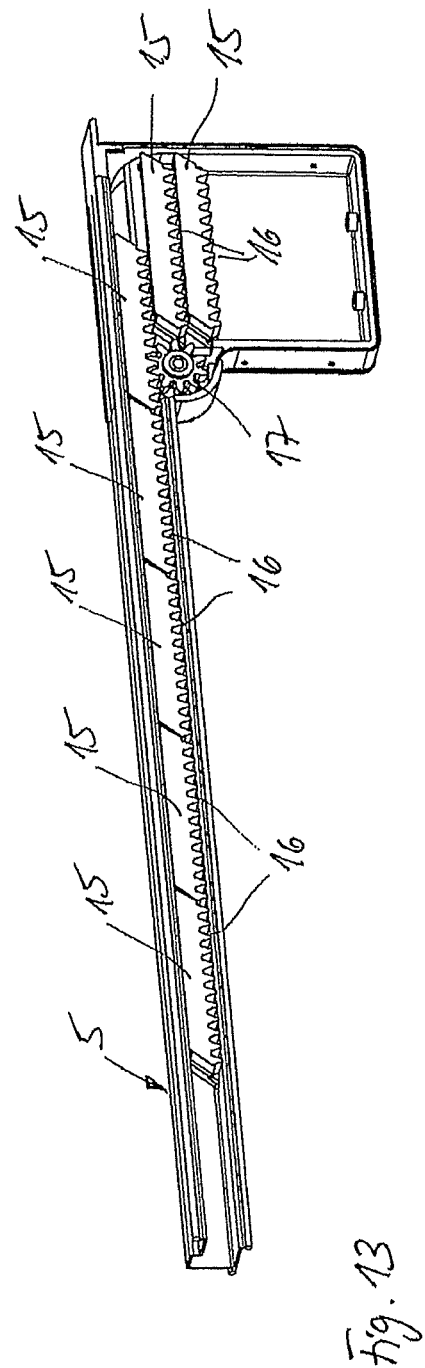

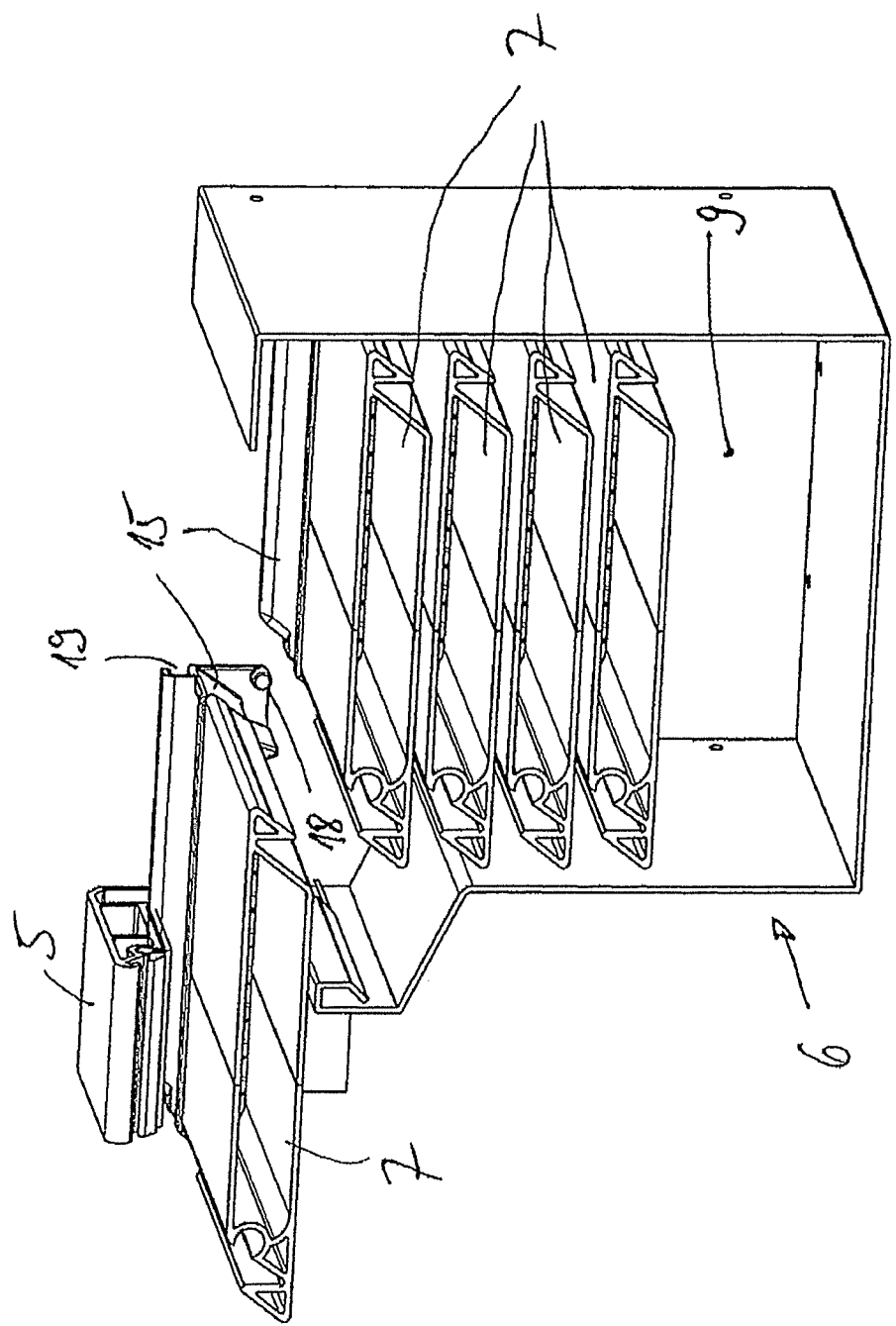

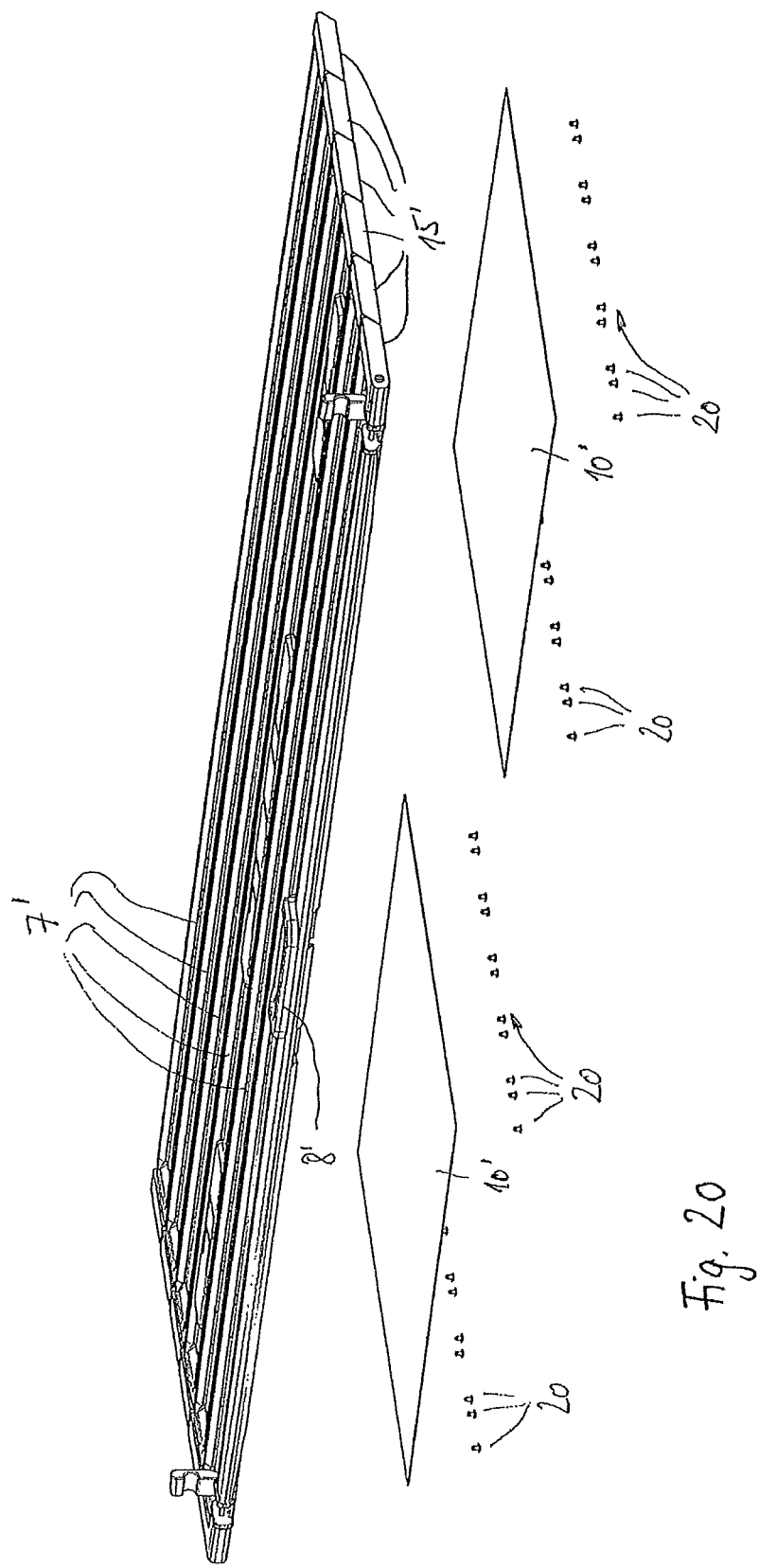

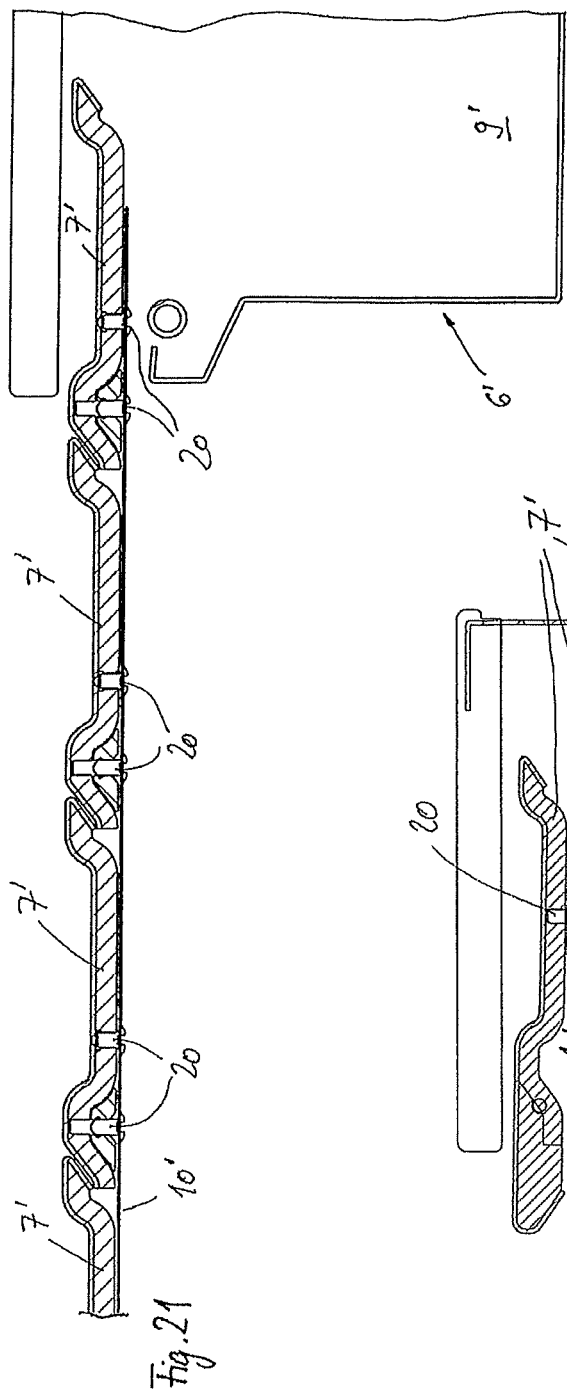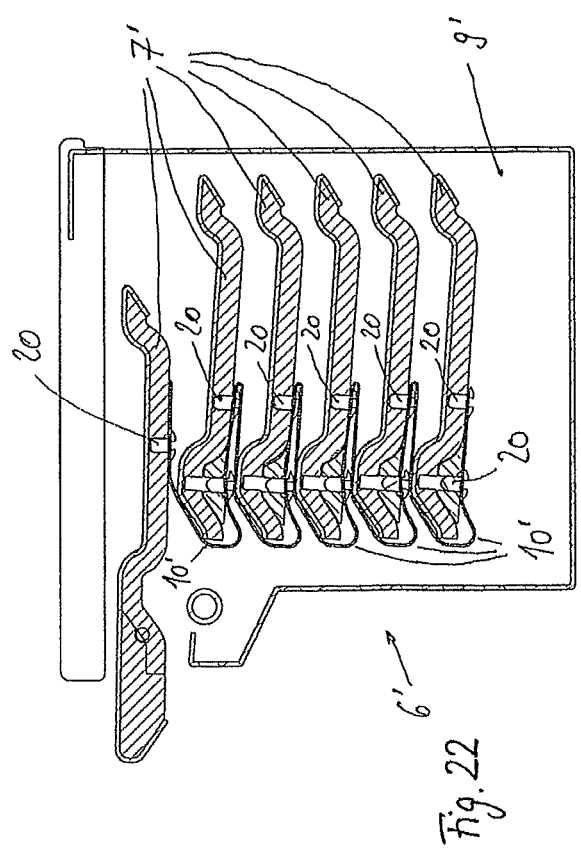

COVERING APPARATUS FOR A LOADING SPACE OF A MOTOR VEHICLE

CROSS-REFERENCE TO RELATED APPLICATIONS

This claims priority from German Application No. 10 2020 210 386.0, filed Aug. 14, 2020, and German Application No. 10 2021 200 418-0, filed Jan. 18, 2021, the disclosures of which are hereby incorporated by reference in their entirety.

TECHNICAL FIELD

The invention relates to a covering apparatus for a loading space of a motor vehicle, with a covering arrangement comprising a plurality of dimensionally stable slats, which are coupled to one another in the extended covering state and are positioned in a manner stacked one on top of another in a receiving space in the stowed inactive position.

BACKGROUND AND SUMMARY

A covering apparatus of this type for a loading space of a pickup vehicle is known from WO 2018/156921 A1. The known covering apparatus is provided for a loading area of the pickup vehicle, which is provided behind a passenger cabin in a rear region of the pickup vehicle. The covering apparatus has a covering arrangement composed of a multiplicity of dimensionally stable metal slats, which in a compactly stowed inactive position are positioned in a cassette housing, arranged at the rear, in a manner stacked one on top of another. The slats are configured as aluminum profiles, which extend in the vehicle transverse direction over a width of the loading area. In an extended covering state, the slats are guided at their oppositely situated face ends in lateral guides that are fixed to the vehicle. The lateral guides are provided in side walls of the loading area of the pickup vehicle. The adjacent slats have complementary hook-shaped profiles on their mutually facing side faces, which profiles interlock in a form-fitting manner in the extension direction in order to obtain a secure connection between the adjacent slats in the extended covering state. The slats are moved between their inactive state, in which they are stacked one on top of another, and the extended covering state by a drive system, which is provided with a drive motor. In the region of their bottom side, the slats have toothings which mesh with a drive pinion of the drive system, in order to cause the slats to advance when they are being transferred out of the cassette housing into the lateral guides.

It is an object of the invention to provide a covering apparatus of the type mentioned in the introduction that enables a simplified construction.

This object is achieved in that the slats are coupled permanently to one another among one another by means of at least one flexible connecting strap. The solution according to the invention allows the use of the covering apparatus in a vehicle interior and a manual actuation of the covering apparatus. The permanent coupling of the slats to one another via the connecting straps makes it possible for the slat structure defining the covering arrangement to be manually extended or retracted into the inactive position, in which they are stacked one on top of another, wherein a slat which is at the front in the extension direction is preferably provided with a grip arrangement for manually gripping this front slat. By virtue of the permanent coupling via the connecting straps, the respectively following slats are necessarily conjointly moved during a manual extending movement, without an additional drive system being necessary. For the permanent coupling, the connecting straps may be connected to the slats in a form-fitting, force-fitting or materially bonded manner, in particular by welt connections, by welded connections or adhesive bonding, by mechanical fastening means in the form of screwed connections or riveted connections, or by similar connections. It is provided according to the invention that a flexible connecting strap is made to extend over the entire composite of dimensionally stable slats and connected to the respective slats. In addition, at least one further connecting strap, which is continuous over the entire length of the slat composite and is made to extend parallel to the first connecting strap, may be provided. As an alternative, it is possible to provide one or more connecting straps, which extend over a plurality of slats and are connected thereto, and the slats which follow it in that case are likewise connected to one another by means of at least one connecting strap, with the result that several groups of dimensionally stable slats are connected to one another in each case by means of at least one connecting strap. Finally, it is provided according to the invention that respectively only two adjacent slats are connected to one another by means of a respective connecting strap, wherein in that case each further slat is coupled by means of at least one respective further slat strap in the manner of a chain.

The solution according to the invention is suitable both for manually operable covering apparatuses and for covering apparatuses which are moved between the inactive position and the covering position by means of a drive system. The connecting straps have only a low weight, with the result that the covering apparatus can be designed as a lightweight construction. The slats may be produced from a light metal alloy, from plastic, from pressed materials, from composite materials or from honeycomb boards or similar strip materials.

In one embodiment of the invention, two respective adjacent slats are coupled to one another by means of at least one respective flexible connecting strap. Corresponding connecting straps are preferably provided in the region of oppositely situated end faces of each slat, with the result that at least two rows of connecting straps are produced on oppositely situated outer sides, i.e. on oppositely situated end-face regions of the slats.

In a further embodiment of the invention, the connecting straps have an at least predominantly inelastic configuration. This avoids an elastic elongation of the connecting straps, which could lead to the slats spreading in the extended covering state.

In a further embodiment of the invention, two respective adjacent slats are coupled to one another via a plurality of connecting straps which are spaced apart parallel to one another. Two respective adjacent slats are preferably coupled to one another via two connecting straps provided at oppositely situated end regions of the slats. As an alternative, it is also possible for more than two connecting straps which are spaced apart in parallel to be arranged uniformly distributed over the lengths of the adjacent slats.

In a further embodiment of the invention, a single connecting strap which extends continuously over an entire length of the slats is provided between two respective adjacent slats. In this way, the connecting strap is used additionally as a seal between two adjacent slats, with the result that a continuous, watertight surface of the covering arrangement can be obtained in the extended covering state of the slats.

In a further embodiment of the invention, the at least one connecting strap is configured as a flat textile strap. The flat strap is preferably produced in the form of a strip from a woven or knitted fabric. A material which is also utilized for belt straps of safety belts in the vehicle interior can also be used as a suitable material.

In a further embodiment of the invention, the at least one connecting strap is configured as a film strap. The film strap is formed by a strip of a plastic film, which may be fiber-reinforced.

In a further embodiment of the invention, each connecting strap is provided on its oppositely situated face-end regions with profiles, which engage in a form-fitting manner in complementary mating profiles on the adjacent slats. The oppositely situated face-end regions are understood to mean an alignment of the connecting strap in the extension direction of the covering arrangement, i.e., in the mounted state, the oppositely situated face-end regions are positioned one behind another in the extension direction. The profiles and complementary mating profiles may have different designs. It is critical that a form fit, which ensures the secure coupling between the adjacent slats, is produced between the profiles and mating profiles in the mounted state.

In a further embodiment of the invention, the connecting straps are connected detachably to the slats in the region of the profiles and the mating profiles. This allows the covering arrangement to be easily mounted or dismounted. The connecting straps are preferably connected to the slats such that they can be detached without a tool.

In a further embodiment of the invention, the profiles on the face-end regions of the connecting straps are configured as welts and the mating profiles on the slats are configured as welt grooves. This produces a particularly secure, form-fitting connection between the connecting straps and the slats.

In a further embodiment of the invention, the mating profiles are provided on the bottom side of the slats, and the mating profiles are positioned on the bottom side—as viewed in the extension direction of the slats—in such a way that the connecting straps are aligned in an at least predominantly tensioned manner both in the extended covering state of the slats and in the inactive state, in which they are stacked one on top of another. The length of the connecting straps is therefore selected such that, in the coupled state with the mating profiles, they are made to extend in an at least predominantly play-free manner both in the inactive state of the slats, in which they are stacked one on top of another, and in the extended covering state.

In a further embodiment of the invention, on oppositely situated end faces the slats have side parts, which are guided in lateral guides that are fixed to the vehicle, and the side parts have at least one respective driver and at least one respective driver profile which, during an extending movement of the slats out of the inactive state, in which they are stacked one on top of another, into the extended covering state, are operatively connected to adjacent slats in such a way that the slat respectively situated at the top entrains the slat which is situated below it for transfer out of the receiving space into the respective lateral guide. The driving function is selected such that, in the state in which they are stacked one on top of another, the slat respectively situated at the top remains in contact with the slat situated below it until at least the front side of the slat situated below it is raised and inserted in the direction of the lateral guides. This solution reliably avoids tilting or jamming of the slats when being transferred out of the inactive state, in which they are stacked one on top of another, into the extended covering state. This embodiment is particularly advantageous for a manual extension or retraction of the covering arrangement, since simple means ensure that the respectively following slat is necessarily entrained by the slat which is adjacent in the extension direction.

In a further embodiment of the invention, the at least one flexible connecting strap is made to extend continuously along all of the slats of the slat composite and is connected to the individual slats in a force-fitting, form-fitting or materially bonded manner. Provided under the form-fitting connection is in particular a connection by mechanical connecting means in the form of rivet connections, screw connections or the like. Materially bonded is understood to mean an adhesive bond, welded connection or soldered connection, wherein a soldered connection is only expedient if the at least one connecting strap has metallic constituent parts and the slats are also configured as light metal slats. A materially bonded connection can also be understood to mean a vulcanization of the at least one connecting strap with the slats. A force-fitting connection may be realized by hook-and-loop closure arrangements.

In a further embodiment of the invention, the connecting strap has a width which corresponds to at least a quarter of a width of a slat. A connecting strap preferably extends over at least almost half of a width of the slat composite—as viewed transversely to the extension direction. In this way, two connecting straps which are positioned lying next to one another can cover the entire width of the slat composite. The two connecting straps are accordingly configured in the manner of flexible connecting webs. It is also possible to configure the connecting straps which adjoin one another in the width direction as overlapping in the width direction. This allows a moisture-tight connection between the slats and thus an at least moisture-repellent, ideally moisture-tight surface of the slat composite in the extended protective position of the slat composite.

Further advantages and features of the invention will emerge from the claims and from the following description of a preferred exemplary embodiment of the invention, which is explained on the basis of the drawings.

BRIEF DESCRIPTION OF THE DRAWINGS

FIG. 1 shows a perspective illustration of a motor vehicle with an open tailgate and a loading space, in which one embodiment of a covering apparatus according to the invention is provided, FIG. 2 shows a perspective illustration of a detail of the covering apparatus according to FIG. 1, FIG. 3 shows a longitudinal sectional illustration of the covering apparatus according to FIG. 2, FIG. 4 shows a perspective, cut-open illustration of the covering apparatus according to FIGS. 2 and 3 in its inactive position, in which the slats are stacked one on top of another, FIG. 5 shows the covering apparatus according to FIG. 4 in a longitudinal section, FIG. 8 shows a perspective illustration of two slats, lying one on top of the other, of the covering apparatus according to FIGS. 2 to 7 with a mounted connecting strap, FIG. 9 shows an exploded illustration of the detail according to FIG. 8, FIG. 10 shows a side view of the detail according to FIG. 8, FIG. 11 shows the exploded illustration according to FIG. 9 but in a side view, FIG. 12 shows a perspective illustration of a partial region of the covering apparatus according to FIGS. 1 to 11 in the region of a lateral guide that is fixed to the vehicle and in the region of a cassette housing which forms a receiving space, FIG. 13 shows an illustration similar to FIG. 12 but in a sectional plane lying further outward in the vehicle transverse direction, FIG. 14 shows a perspective, sectional illustration of a detail of the covering apparatus according to FIGS. 2 to 13 in the region of a transfer of the slats from the cassette housing into the lateral guide that is fixed to the vehicle, FIG. 20 shows a perspective exploded illustration of a further embodiment of a covering apparatus according to the invention that is similar to FIGS. 1 to 19, FIG. 21 shows a longitudinal sectional illustration of a partial region of the covering apparatus according to FIG. 20 in an extended functional position and FIG. 22 shows the covering apparatus according to FIGS. 20 and 21 in the inactive position, in which the slats are stacked one on top of another, inside a cassette housing.

DETAILED DESCRIPTION

Figure 6:
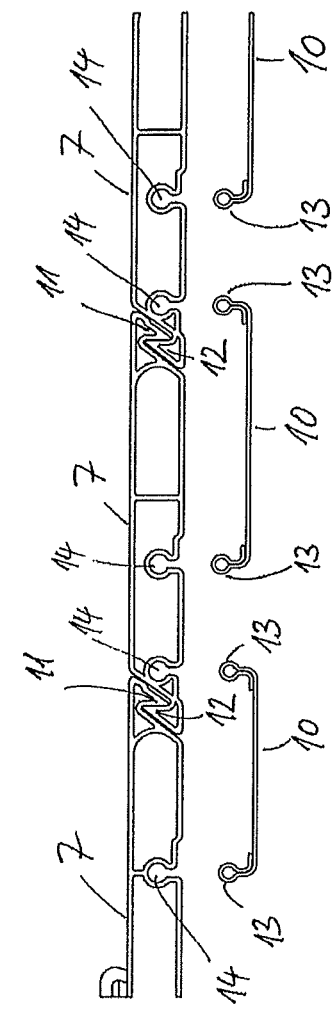
FIG. 6 shows an enlarged illustration of a plurality of interlocking slats of the covering apparatus according to FIGS. 2 to 5 with still unmounted connecting straps.
Figure 7:
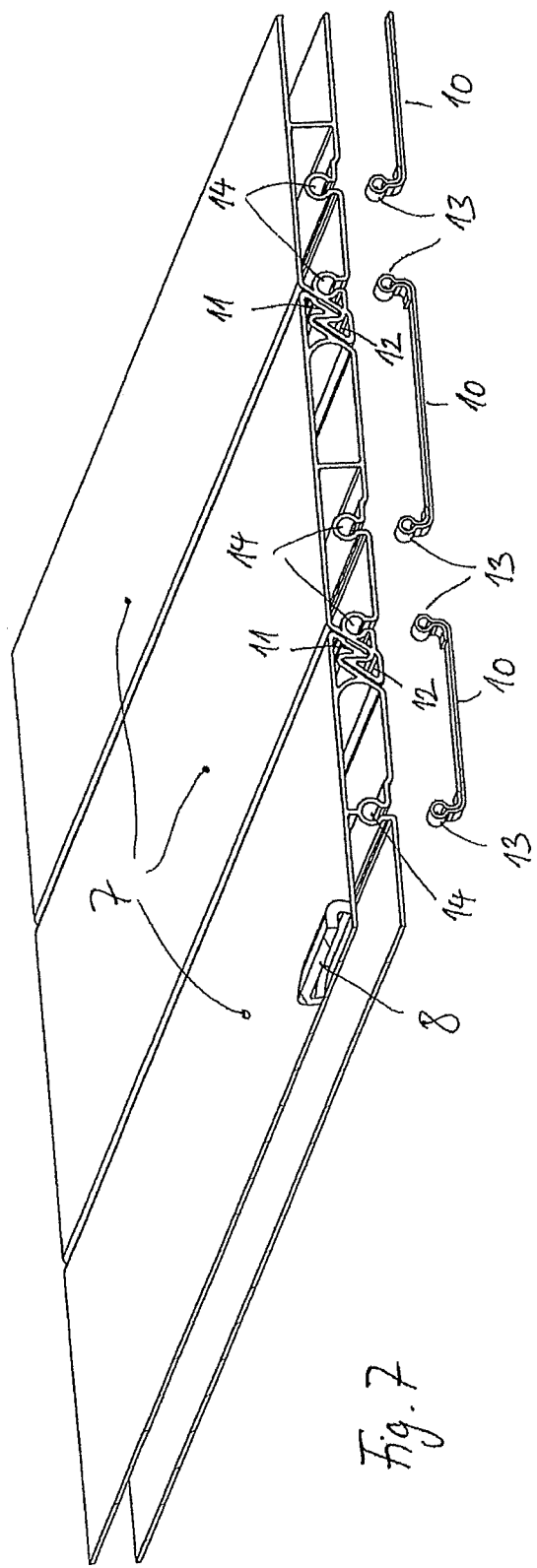
FIG. 7 shows the illustration according to FIG. 6 but in a perspective view.
Figure 15:
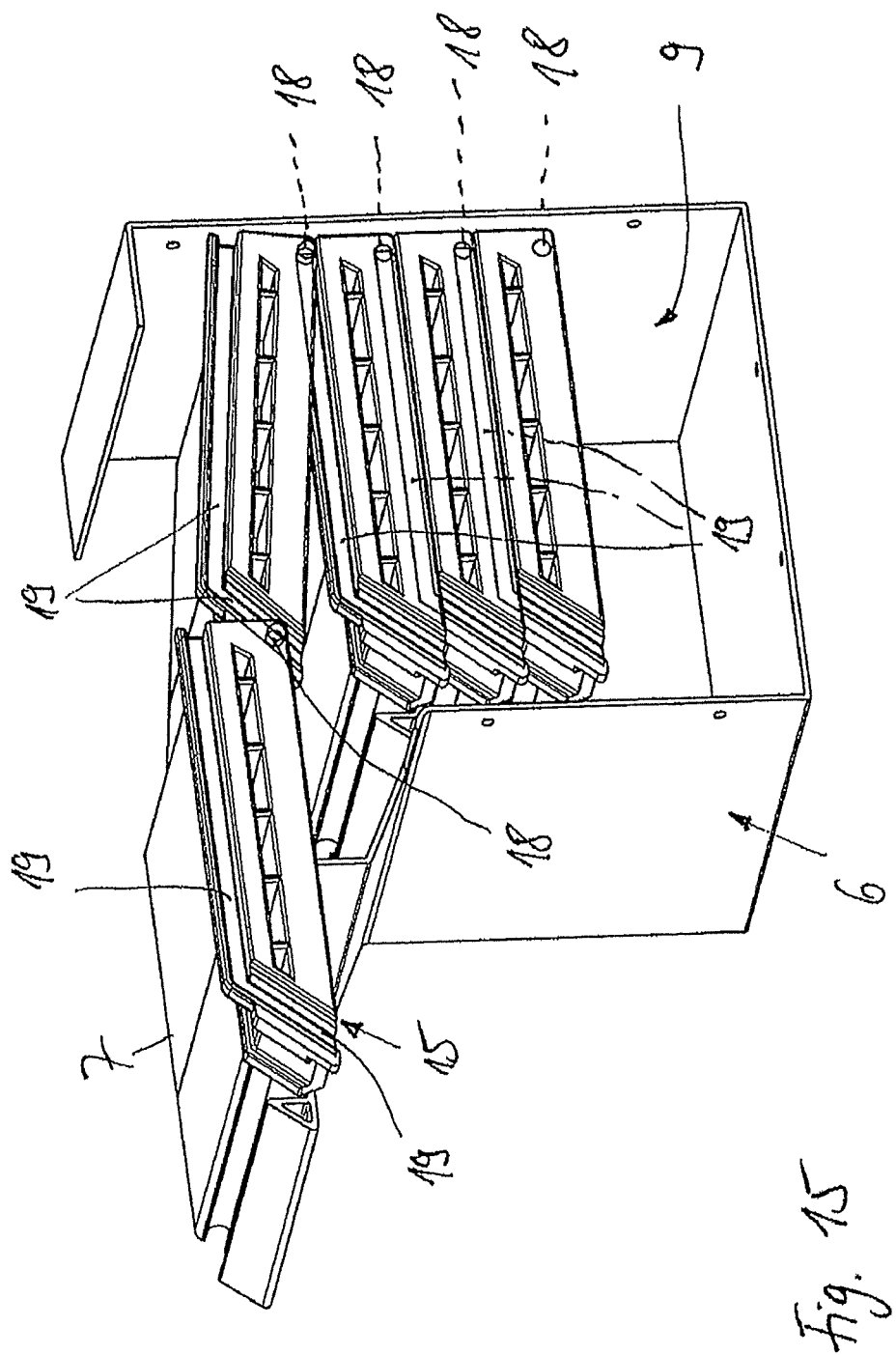
FIG. 15 shows an illustration similar to FIG. 14 but from a different perspective laterally from the outside and omitting the lateral guide that is fixed to the vehicle.
Figure 16:
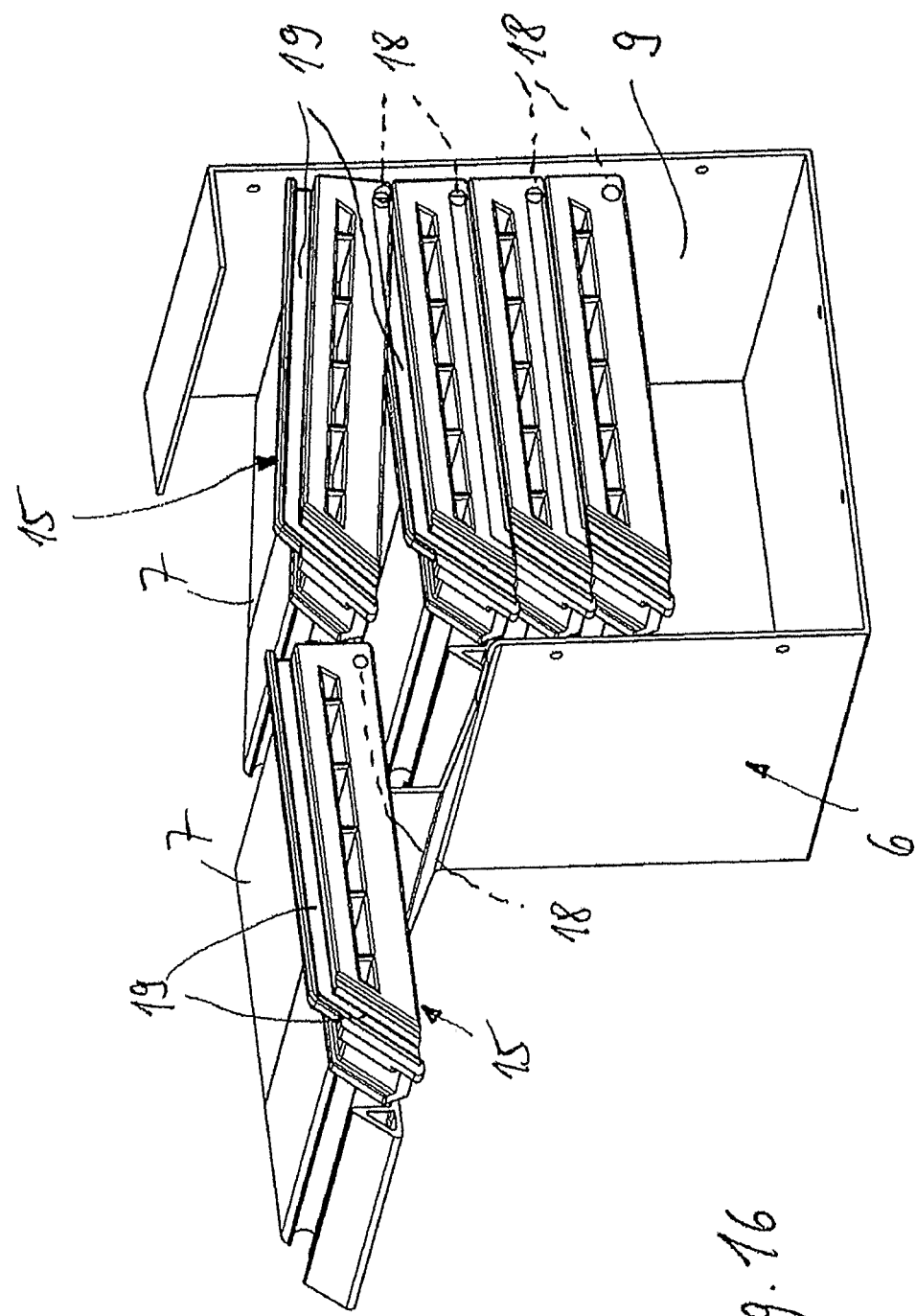
FIG. 16 shows an illustration according to FIG. 15.
Figure 17:
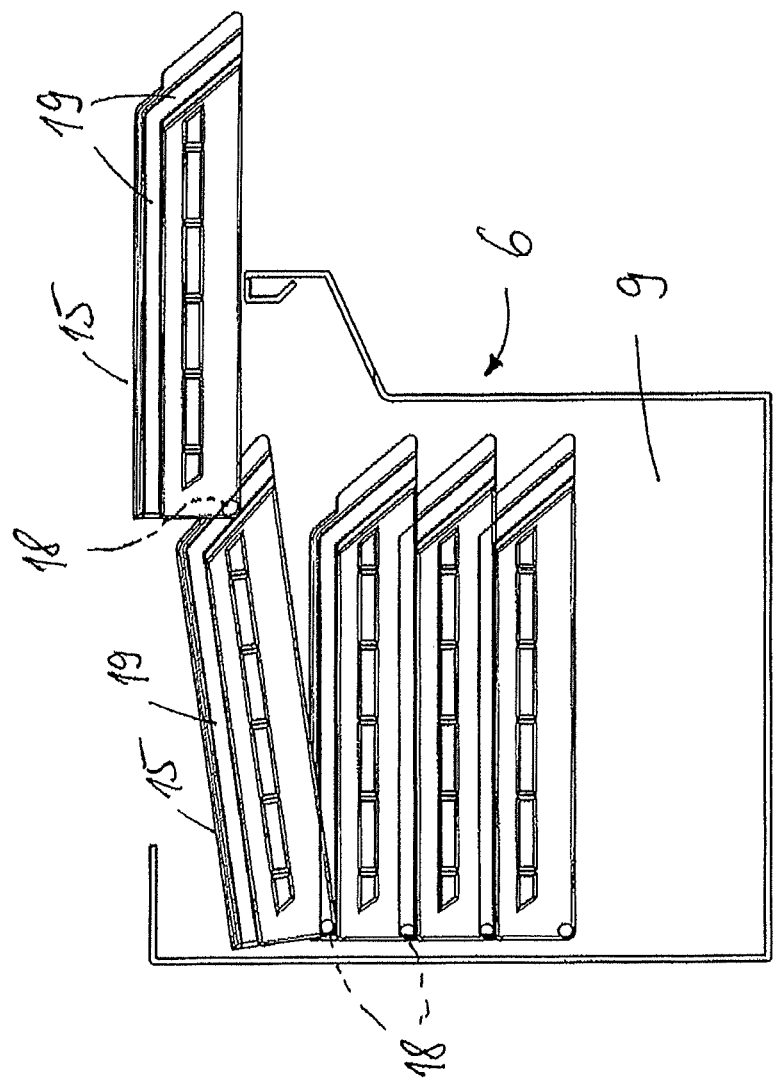
FIG. 17 shows a side view of a functional state of the covering apparatus according to FIG. 15.
Figure 18:
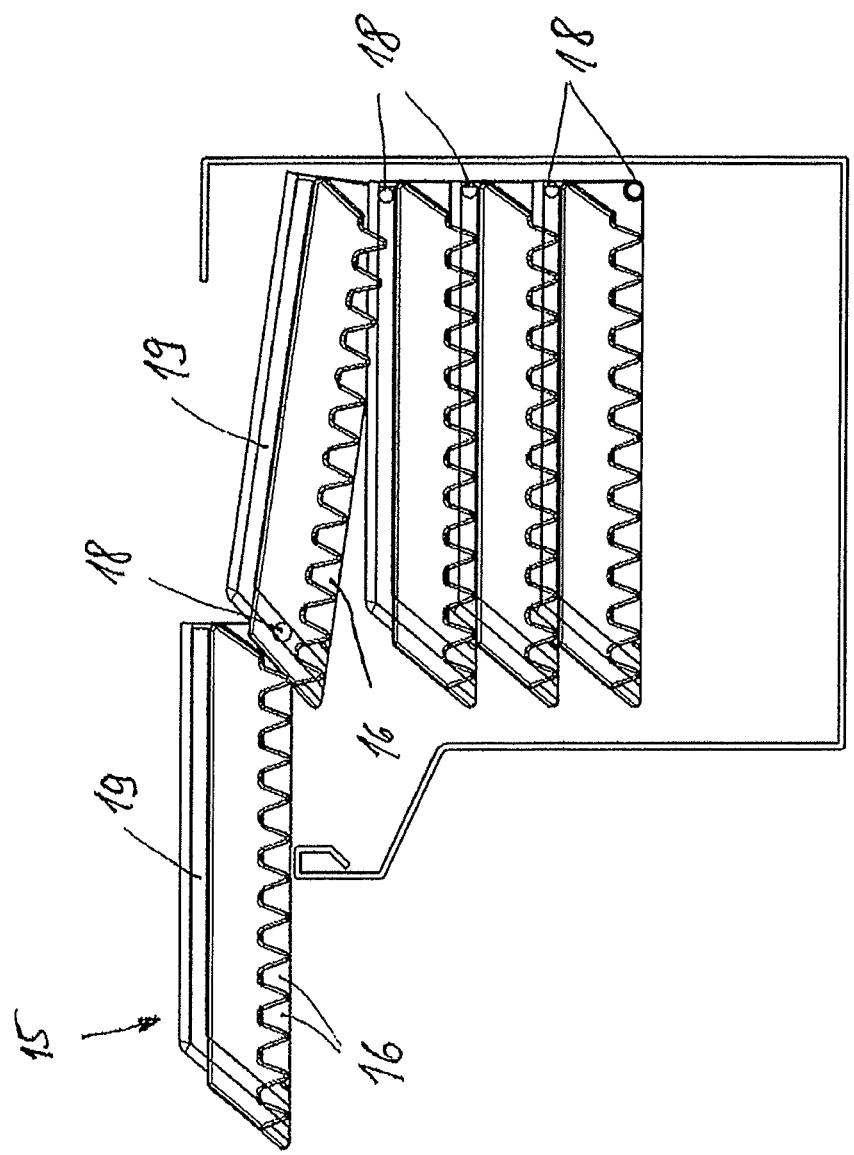
FIG. 18 shows a side view from a side situated opposite that in FIG. 17 of the functional state according to FIG. 17.
Figure 19:
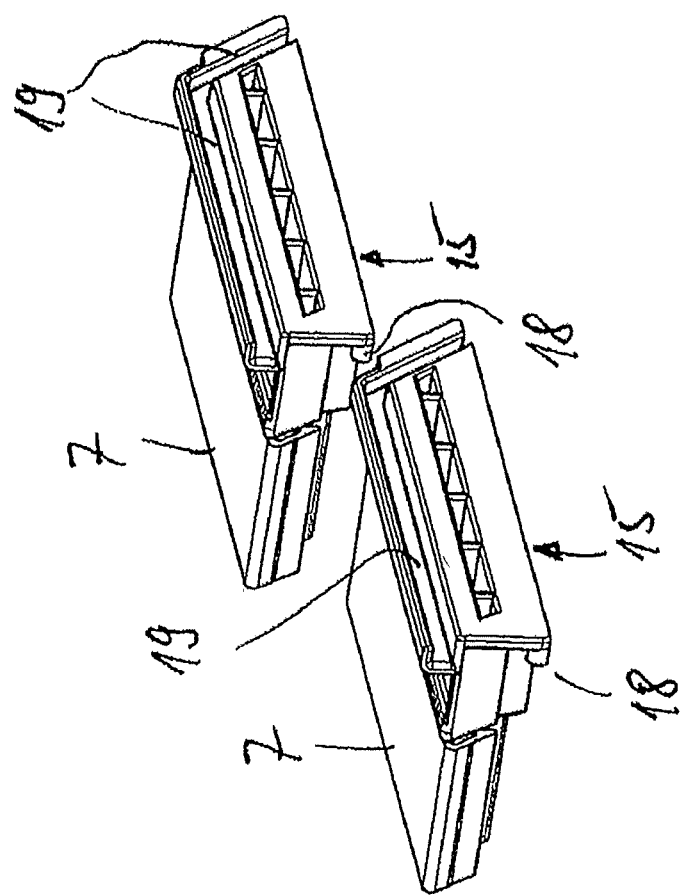
FIG. 19 shows a perspective illustration of a detail of the covering apparatus according to FIGS. 2 to 18 in the region of side parts of two adjacent slats.

A motor vehicle 1 in the form of a van has a vehicle interior, which is composed of a passenger compartment and a rear loading space 2 which adjoins the passenger compartment. Rear access to the loading space 2 can be closed off by a tailgate 3. Assigned to the loading space 2 is a covering apparatus 4, as described in more detail below on the basis of FIGS. 2 to 19.

The covering apparatus 4 has a covering arrangement which is formed by a plurality of slats 7 and can be displaced between a compactly stowed inactive position and an extended covering position, shown in FIG. 1. The slats 7 of the covering arrangement are guided and supported in their covering position in oppositely situated lateral guides 5 that are fixed to the vehicle. The oppositely situated lateral guides 5 are respectively provided in a side wall of the loading space 2 and fixedly connected to load-bearing structural parts of the body of the motor vehicle 1 in a manner not illustrated in more detail, in order to allow a crash-proof arrangement of the lateral guides 5 in the side walls of the loading space 2.

The covering arrangement of the covering apparatus 4 is accommodated in a receiving space 9 of a cassette housing 6, which is likewise arranged fixed to the vehicle, in the compactly stowed inactive position. The cassette housing 6 is made to extend behind a backrest arrangement of a rear seat bench in the vehicle transverse direction and is held fixed to the vehicle at a spacing below a lateral trim of the motor vehicle 1. In the extended covering state, the covering arrangement that can be stowed in the cassette housing 6 forms an intermediate floor according to FIG. 1, which is arranged below a lateral trim delimited by lower edge regions of the side windows but above a loading-space floor. The cassette housing 6 is fastened detachably in the loading space 2 in order to be able to remove the cassette housing 6 including the covering arrangement from the vehicle as required. The cassette housing 6 has a passage slot which faces the vehicle rear in the installed state, extends in the vehicle transverse direction over at least predominantly the entire width of the cassette housing 6, and is aligned in line with the lateral guides 5 in the oppositely situated side walls of the loading space 2.

In the present exemplary embodiment, the slats 7 are formed by dimensionally stable hollow profiles of a light metal alloy, in the present case an aluminum alloy, which extend in the manner of strips over an entire width of the loading space 2 in the vehicle transverse direction. Each slat 7 is provided at the front with an upwardly facing hook profile 12 and at the rear with a complementary, downwardly directed hook profile 11, wherein a respective front hook profile 12 in the extended covering state of the slats 7 engages in a form-fitting manner in a downwardly protruding, rear hook profile 11 of the adjacent slat 7—as viewed in the extension direction. In the compactly stowed inactive state, the slats 7 are stowed in a manner stacked one on top of another in the receiving space 9 of the cassette housing 6. A support spring, which in the present case is designed as a conically configured helical spring 10*a* (FIG. 3), constitutes a compression spring which is supported on a floor of the receiving space 9 of the cassette housing 6 and supports the respectively lowermost slat 7 with its upper face end. On account of the conical helical configuration, in the compressed state the helical spring 10*a* can be compressed to the height of approximately a single helical winding. The rest of the helical windings lie in a spiral-shaped manner in the same plane within this lowermost helical winding, which is the largest in terms of diameter.

The slats 7 are connected to one another using connecting straps 10, wherein a plurality of connecting straps 10 connect two respective slats 7 to one another. The connecting straps 10 extend in the extension direction and are designed as flat textile straps. Each connecting strap has a respective connector or welt 13, which engages in a form-fitting manner in a connector or welt groove 14 extending in the longitudinal direction of the respective slat 7, on its oppositely situated face-end regions, accordingly at the front and rear in the mounted state. Each welt groove 14 is open in relation to a bottom side of the respective slat 7 so as to form an undercut, with the result that the associated welt 13 of the respective connecting strap 10 is held in the respective welt groove 14 in a form-fitting manner downwardly in the vehicle height direction. Each slat 7 has two welt grooves 14, which are spaced apart parallel to one another and constitute the mating profiles in the context of the invention, in the region of its bottom side. The welts 13 of the connecting straps 10 form complementary profiles to these mating profiles. The welts 13 of the connecting straps 10 can be pushed in in the longitudinal direction of the slats 7 for mounting from an open end face of the respective welt groove 14. As can be clearly seen on the basis of FIGS. 6 to 11, each slat 7 has two welt grooves 14, a first of which is arranged in a front region and a second of which is arranged in a center region of the bottom side of the slat 7. The welt grooves 14 are conjointly shaped in one piece when the hollow profile of the slats 7 is being produced. The front welt groove 14—as viewed in the extension direction—serves to receive a rear welt 13 of a connecting strap 10, while the center welt groove 14 is provided to receive a front welt 13 of a connecting strap 10 that is adjacent to the rear side. It can be seen on the basis of FIGS. 8 to 11 that, in the state in which the slats 7 are stacked one on top of another, the connecting straps 10 are folded upwardly and rearwardly and accordingly lie between the slats 7 which are respectively adjacent one above another. The connecting straps 10 are tensioned both in the inactive state of the slats 7, in which they are stacked one on top of another, and in the extended covering state, as can be gathered from the illustrations. The tensioned or stretched position of the connecting straps 10 in the different end positions, i.e. the inactive state on the one hand and the covering state on the other hand, is selected, however, such that a small amount of play remains, in order that a jamming or wedging of the adjacent slats 7 relative to one another is not brought about.

A slat 7 which is at the front in the extension direction is provided with a grip element 8, in order to allow a manual extension or retraction of the slats between the covering position and the inactive position.

In order that an inclination or wedging of the slats in the mutually opposite lateral guides 5 is not brought about during a corresponding manual extending operation, assigned to the covering arrangement is a synchronizing device, which comprises a synchronizing shaft provided with two toothed pinions 17 at oppositely situated face-end regions. The synchronizing shaft extends in the vehicle transverse direction inside the cassette housing 6 and is mounted in a freely rotatable manner in the cassette housing 6. The toothed pinions 17 (FIG. 13) at oppositely situated face-end regions of this synchronizing shaft mesh with toothing portions 16, which extend along the respective lateral guide 5, in the region of side parts 15 of the slats 7, wherein the linear toothing portions 16 (toothed-rack portions) face downward. The toothing portions 16 are arranged on side parts 15 which are fastened to oppositely situated end faces of each slat 7. When the slats 7 are extended along the lateral guide 5, the toothing portions 16 come into contact with the respective toothed pinion 17 from above. The synchronizing device may at the same time be assigned a drive device, which can drive the slats 7 both in the extension direction and in the retraction direction by way of the toothing portions 16 and the toothed pinions 17. Such a drive is configured analogously to WO 2018/156921 A1.

The side parts 15 additionally have drivers 18 on the one hand and driver profiles 19 on the other hand, wherein a respective driver 18 of a slat permanently engages in a driver profile 19, lying therebeneath, of a side part 15 of the slat 7 arranged adjacently below, specifically as long as the slats 7 are located in their inactive state, in which they are stacked one on top of another, within the receiving space 9 of the cassette housing 6, and also when the slats 7 are transferred into the extended covering state.

As can be seen on the basis of FIGS. 14 to 19, the driver profiles 19 are configured as longitudinal grooves that are open outwardly and obliquely downwardly at the front and rearwardly. Each side part 15 has a respective driver 18 on a rear, lower end region of the respective side part 15. Each driver profile 19 has a linear portion which extends parallel to a top side of the respective slat 7, and a further linear portion which is angled away therefrom and extends in an inclined manner to the front and downwardly, wherein the linear portions of a respective side part 15 transition into one another in an open manner. In the state in which the slats are stacked one on top of another, a respective driver 18 of the slat 7 lying above a given slat is positioned at the rear in the upper linear portion of the driver profile 19 of the slat 7 lying beneath that given slat. Each driver 18 is designed as a cylindrical journal, with the result that each driver 18 is mounted not only in a longitudinally movable manner in the driver profile 19 of the slat 7 lying beneath a given slat, but also in a rotationally movable manner in this driver profile 19.

As soon as the frontmost slat 7, which is provided with the grip element 8 and also in the inactive position is positioned in the passage slot of the cassette housing 6 at the height of the lateral guide 5, is extended by hand away from the cassette housing 6 in the extension direction, the driver 18 on each side, i.e. the two drivers 18 on the oppositely situated side parts 15 of this slat 7, entrains the following slat 7. This following slat is already aligned obliquely upwardly on account of the positioning of the frontmost slat 7 and, when the frontmost slat 7 is subjected to tensile loading, is moved in the extension direction via the toothed pinion 17 and guided necessarily into the lateral guides 5 by virtue of the corresponding tensile loading. During this movement, the drivers 18 of this second slat 7 run in the driver profiles 19 of the third slat 7, which is still stacked in the receiving space 9. As soon as the driver 18 arrives in the portions of the driver profiles 19 that are inclined downwardly to the front, this slat 7 is necessarily raised obliquely upward and likewise drawn out toward the toothed pinions 17 and the lateral guides 5. This mode of operation continues until the covering arrangement composed of the multiplicity of slats 7 that are joined to one another has reached the extended covering position. A retraction is effected correspondingly in reverse by manually applying compressive loading to the frontmost slat, as a result of which the rest of the slats 7 are pushed in the direction of the passage slot of the cassette housing 6 and necessarily stack one on top of another again in the receiving space 9. The drivers 18 remain permanently in the driver profiles 19 of the respectively following slat 7.

A covering apparatus according to FIGS. 20 to 22 corresponds largely to the covering apparatus according to FIGS. 1 to 19 described above. To avoid repetitions, reference is therefore additionally made to the embodiments relating to the covering apparatus according to FIGS. 1 to 19. Components or portions with the same function are provided with the same reference signs, but with the addition of a prime '. The differences of the covering apparatus according to FIGS. 20 to 22 are addressed below.

The covering apparatus according to FIGS. 20 to 22 has a multiplicity of dimensionally stable slats 7', to which a respective side part 15' is assigned on mutually opposite end faces. A slat which is at the front in the extension direction and thus in the direction of the extended functional position is provided with a grip element 8', which allows the slat composite to be manually gripped. A significant difference to the covering apparatus according to FIGS. 1 to 19 is that the slat composite composed of the multiplicity of slats 7' arranged one behind another is connected together via two connecting straps 10' which are parallel to one another, wherein each connecting strap 10' extends over the entire length of all of the slats 7' and thus over the entire length of the slat composite. Each connecting strap 10' is accordingly connected to all of the slats 7' of the slat composite. The connection of the connecting straps 10' to the slats 7' is effected via mechanical connecting means in the form of rivet connections 20, which can be seen on the basis of FIGS. 20 to 22. The connecting straps 10' extend parallel next to one another over the length of the slat composite and have a relatively large width which extends approximately over a range between a quarter and a third of the width of the slats 7'. The two connecting straps 10' adjoin the side parts 15' directly on the outside and extend with their width transversely to the extension direction toward the center. In the extended functional position of the slat composite, the two connecting straps 10' are aligned on the bottom side of the slat composite in a planar and stretched manner. In the inactive position of the slat composite, in which the slats 7' are arranged stacked one on top of another in the receiving space 9' of the cassette housing 6', the respective connecting strap 10' is necessarily folded, as can be seen in FIG. 22. As FIG. 21 shows, the mechanical connecting means, in the present case the rivet or screw connections 20, are positioned in a front half of the respective slat 7' in such a way that a sufficiently long, loose connecting strap portion is produced between two respective slats 7' that makes the corresponding folding possible.

The invention claimed is:

1. A covering apparatus for a loading space of a vehicle, the vehicle having a longitudinal axis oriented generally along a front-to-rear direction thereof, said covering apparatus comprising:
    a plurality of slats, each said slat having an elongated configuration with a longitudinal dimension oriented, in use in the loading space of the vehicle, transversely to the longitudinal axis of the vehicle, each said slat having spaced-apart front and rear longitudinal edge portions oriented transversely to the longitudinal axis of the vehicle, an upper side and a lower side facing opposite said upper side;
    at least one flexible connecting strap interconnecting said slats in side-by-side adjacent relation with one another with said front longitudinal edge portions of said slats disposed adjacent respective rear longitudinal edge portions of adjacent ones of said slats; and
    said covering apparatus being mounted in the loading space of the vehicle for movement in an extension direction into an extended state and into a stowed inactive state, said covering apparatus in the extended state covering at least a portion of the loading space of the vehicle and in the stowed inactive state uncovering at least a portion of the loading space of the vehicle, said slats in the stowed inactive state of said covering apparatus being vertically stacked one atop another in a receiving space to form a stack, said at least one flexible strap being fixed to said lower sides of at least some of said slats and being configured to maintain a fixed connection between all of said slats for an entirety of an extension movement in the extension direction of said covering apparatus from the stowed inactive state to the extended state.

2. The covering apparatus according to claim 1, wherein said at least one flexible strap comprises a plurality of flexible straps, each said flexible strap being fixed to said lower sides of two adjacent ones of said slats so as to extend therebetween in a direction substantially parallel to the longitudinal vehicle axis.

3. The covering apparatus according to claim 2, wherein each two adjacent ones of said slats are interconnected to one another by at least two of said flexible straps, said at least two flexible straps being oriented substantially parallel to one another and spaced from one another longitudinally along said two adjacent ones of said slats.

4. The covering apparatus according to claim 2, wherein each two adjacent ones of said slats are interconnected to one another by a single one of said straps extending continuously over substantially an entire longitudinal extent of said two adjacent ones of said slats.

5. The covering apparatus according to claim 1, wherein said at least one flexible strap extends continuously along all of said slats in a direction substantially parallel to the longitudinal axis of the vehicle, said at least one flexible strap being fixed to said lower sides of all of said slats.

6. The covering apparatus according to claim 5, wherein said at least one flexible strap comprises two flexible straps, said two flexible straps each extending continuously along all of said slats in a direction substantially parallel to the longitudinal axis of the vehicle and each being fixed to said lower sides of all of said slats, said two flexible straps being disposed in side-by-side relation with one another in a direction substantially parallel with the longitudinal dimensions of said slats and each of said two flexible straps having a dimension oriented, in use in the loading space of the vehicle, transversely to the longitudinal axis of the vehicle, the dimensions of said two flexible straps being equal to at least one quarter of the longitudinal dimensions of said slats.

7. The covering apparatus according to claim 1, wherein said at least one flexible strap is substantially inelastic.

8. The covering apparatus according to claim 1, wherein said at least one flexible strap comprises a flat textile strap or a film strap.

9. The covering apparatus according to claim 1, wherein said front longitudinal edge portions of said slats have respective front contoured profiles and said rear longitudinal edge portions of said slats have respective rear contoured profiles, said front and rear contoured profiles comprising respective mating surfaces configured so as to be complementary to one another, and said mating surfaces of respective adjacent ones of said front and rear contoured profiles of said slats are engaged with one another in the extended state of said covering apparatus.

10. The covering apparatus according to claim 2, wherein each said slat includes a pair of connectors disposed on said lower side thereof, said connectors of each said slat being spaced-apart from one another in a direction substantially parallel to the longitudinal axis of the vehicle, each said flexible strap including first and second connectors adjacent respective opposite ends thereof, said first connector of each said flexible strap being lockingly engaged with one of said connectors of one of said slats and said second connector of each said flexible strap being lockingly engaged with one of said connectors of an adjacent one of said slats.

11. The covering apparatus according to claim 10, wherein said connectors of each said slat comprise respective grooves opening downwardly through said lower side of the respective said slat.

12. The covering apparatus according to claim 1, wherein said plurality of slats comprises an end slat configured for gripping, said end slat being disposed further from said receiving space than all remaining ones of said slats when said covering apparatus is in the extended state, said at least one flexible strap fixedly interconnecting said slats such that manual movement of said end slat in the extension direction moves said all remaining ones of said slats in the extension direction when said covering apparatus is transferred from the stowed inactive state to a fully extended state.

13. The covering apparatus according to claim 1, wherein each said slat includes a pair of opposite ends spaced from one another longitudinally along the respective said slat, said ends of each said slat including respective side parts guided, in use in the loading space of the vehicle, in respective lateral guides fixed to the vehicle, said side parts each including at least one driver and at least one driver profile, wherein during movement of said covering apparatus from the stowed inactive state and into the extended state, said at least one driver of one said slat is operatively connected to said at least one driver profile of an adjacent one of said slats such that said slat situated uppermost in the stack entrains said slat situated immediately therebelow for transfer out of said receiving space and into the respective lateral guides of the vehicle.

14. A covering apparatus for a loading space of a vehicle, the vehicle having a longitudinal axis oriented generally along a front-to-rear direction thereof, said covering apparatus comprising:
  a plurality of slats, each said slat having an elongated configuration with a longitudinal dimension oriented, in use in the loading space of the vehicle, transversely to the longitudinal axis of the vehicle, each said slat having spaced-apart front and rear longitudinal edge portions oriented transversely to the longitudinal axis of the vehicle, an upper side and a lower side facing opposite from said upper side, said front longitudinal edge portions of said slats having respective front contoured profiles and said rear longitudinal edge portions of said slats having respective rear contoured profiles, said front and rear contoured profiles comprising respective mating surfaces configured so as to be complementary to one another;
  at least one flexible connecting strap interconnecting said slats in adjacent relation with one another in the loading space of the vehicle such that said front longitudinal edge portions of said slats are disposed adjacent respective rear longitudinal edge portions of adjacent ones of said slats; and
  said covering apparatus being mounted in the loading space of the vehicle for movement in an extension direction into an extended state and into a stowed inactive state, said covering apparatus in the extended state covering at least a portion of the loading space of the vehicle and in the stowed inactive state uncovering at least a portion of the loading space of the vehicle, said slats in the stowed inactive state of said covering apparatus being vertically stacked one atop another in a receiving space to form a stack, said at least one flexible strap being fixed to said lower sides of at least some of said slats and maintaining a fixed connection between all of said slats for an entirety of an extension movement in the extension direction of said covering apparatus from the stowed inactive state to the extended state, and said mating surfaces of respective adjacent ones of said front and rear contoured profiles of said slats being engaged with one another in the extended state of said covering apparatus.

15. The covering apparatus according to claim 14, wherein said at least one flexible strap comprises a plurality of flexible straps, each said flexible strap being fixed to said lower sides of two adjacent ones of said slats so as to extend therebetween in a direction substantially parallel to the longitudinal vehicle axis.

16. The covering apparatus according to claim 15, wherein each two adjacent ones of said slats are interconnected to one another by a single one of said straps extending continuously over substantially an entire longitudinal extent of said two adjacent ones of said slats.

17. The covering apparatus according to claim 13, wherein said at least one flexible strap extends continuously along all of said slats in a direction substantially parallel to the longitudinal axis of the vehicle, said at least one flexible strap being fixed to said lower sides of all of said slats.

18. The covering apparatus according to claim 14, wherein each said slat includes a pair of connectors disposed on said lower side thereof, said connectors of each said slat being spaced-apart from one another in a direction substantially parallel to the longitudinal axis of the vehicle, each said flexible strap including first and second connectors adjacent respective opposite ends thereof, said first connector of each said flexible strap being lockingly engaged with one of said connectors of one of said slats and said second connector of each said flexible strap being lockingly engaged with one of said connectors of an adjacent one of said slats.

19. The covering apparatus according to claim 18, wherein said connectors of each said slat comprise respective grooves opening downwardly through said lower side of the respective said slat.

20. A covering apparatus for a loading space of a motor vehicle, comprising a covering arrangement including a plurality of dimensionally stable slats coupled to one another in an extended covering state and positioned in a manner stacked one on top of another in a receiving space in a stowed inactive position, the slats being coupled to one another by flexible connecting straps, each connecting strap being provided on oppositely situated face-end regions thereof with profiles, the profiles engaging in a form-fitting manner in complementary mating profiles on adjacent ones of the slats, the mating profiles being provided on a bottom side of the slats and being positioned on the bottom side, as viewed in an extension direction of the slats, such that the connecting straps are aligned in an at least predominantly tensioned manner both in the extended covering state of the slats and in the stowed inactive position, in which stowed inactive position the slats are stacked one on top of another.

* * * * *